United States Patent Office 3,433,821
Patented Mar. 18, 1969

3,433,821
PRODUCTION OF AROMATIC NITRILES FROM CYANOGEN HALIDE AND AN AROMATIC COMPOUND USING AN ALUMINO-SILICATE CATALYST
Lyle A. Hamilton, Pitman, and Phillip S. Landis, Woodbury, N.J., assignors to Mobil Oil Corporation, a corporation of New York
No Drawing. Filed Dec. 15, 1965, Ser. No. 514,134
U.S. Cl. 260—465
Int. Cl. C07c *121/02*
10 Claims

ABSTRACT OF THE DISCLOSURE

A process for producing aromatic nitriles which comprises reacting an aromatic compound, e.g., benzene, and a cyanogen halide, e.g., cyanogen chloride, at a temperature from about 0° C. to about 300° C. in the presence of a catalyst comprising an alumino-silicate catalyst containing active cation sites within an ordered internal structure having a uniform pore size of from at least 6 A. to about 15 A., e.g., a rare earth exchanged faujasite, to produce a nitrile product, e.g., benzonitrile.

---

This invention relates to the production of aromatic nitriles and, in particular, to the production of aromatic nitriles in the presence of alumino-silicates that have unique catalytic activity.

This invention contemplates production of aromatic nitriles by effecting reaction of an aromatic compound and a cyanogen halide in the presence of an alumino-silicate catalyst containing active cation sites within an ordered internal structure. In particular, this invention is directed to a process in which an aromatic compound having the formula:

$$Ar(R)_n$$

is reacted with a cyanogen halide to produce an aromatic nitrile in the presence of the alumino-silicate catalyst. In the above formula, Ar is an aromatic nucleus having at least one hydrogen atom attached to it; R is the same or a different monovalent group saturated or only weakly unsaturated at the point of attachment to the aromatic nucleus; and n is an integer that may vary from 0 to about 10, but it usually varies from 0 to about 4 depending on the identity of Ar.

Among the monovalent groups that may be attached to the aromatic nucleus are alkyl radicals, such as methyl, ethyl, n-propyl, isopropyl, n-butyl, t-butyl, n-hexyl, n-dodecyl, and the like; cycloalkyl radicals, such as cyclohexyl, cyclopentyl, bicyclohexyl, and the like; alkoxy and aryloxy substituted alkyl and cycloalkyl radicals, such as methoxymethyl, ethoxyethyl, 3-ethoxy n-propyl, 2-methoxy cyclophexyl, phenoxymethyl, 2-phenoxyethyl and the like; alkoxy radicals, such as methoxy, ethoxy, propoxy, butoxy, amoxy, and the like; aralkyl radicals, such as benzyl 2-phenylethyl, 1-phenyl-n-butyl, and the like; aryl radicals, such as phenyl, naphthyl, anthryl, and the like. These groups can contain 1 to 20 carbon atoms, and preferably, from 1 to 12 carbon atoms.

Exemplary of the aromatic compounds suitable for the production of nitriles are benzene, toluene, o-xylene, m-xylene, p-xylene, hemimellitene(1,2,3-trimethylbenzene), pseudocumene(1,2,4-trimethylbenzene), mesitylene(1,3,5-trimethylbenzene), ethylbenzene, n-propylbenzene, cumene(isopropylbenzene), n-butylbenzene, t-butylbenzene, diphenyl methane, naphthalene, α-methyl naphthalene, β-methyl naphthalene, α-ethylnaphthalene; 1,4-dimethyl napthalene, anisole, 4-ethyl anisole, veratrole, 2-methyl anisole, phenetole, 1,2-dimethoxybenzene; 1,3-dimethoxy benzene; p-dimethoxybenzene; 1,2,3-trimethoxy benzene; p-methoxy phenol, α-methoxy naphthalene, α-ethoxy naphthalene, β-methoxy naphthalene, acenaphthene, anthracene, and the like.

In general, these aromatic compounds have at least one hydrogen atom attached to a nuclear carbon atom of the aromatic ring and contain 6 to 30 carbon atoms within their molecular moieties; those compounds containing 6 to 20 carbon atoms being the preferred reactants.

The cyanogen halides utilized in accordance with the process of this invention include cyanogen chloride, cyanogen bromide, and cyanogen iodide. Since reactions involving cyanogen iodine frequently yield iodo-compounds rather than nitriles, cyanogen chloride and cyanogen bromide are the preferred halides for preparation of aromatic nitriles.

In general, the cyanogen halides are freshly prepared prior to their use in the production of aromatic nitriles. It will be understood that cyanogen halides tend to polymerize upon standing and thereby produce trihalo cyclic triazines, i.e., cyanuryl halides, which in turn will react with the aromatic compounds to yield aromatic substituted cyclic triazines.

It will be appreciated that the halides, particularly cyanogen bromide which may be a crystalline solid at the reaction temperatures of this process, are usually dissolved in the aromatic compound to be converted to a nitrile before being passed over the alumino-silicate catalyst. In instances when a solid aromatic compound is reacted, both the halide and the aromatic compound may be dissolved in an inert solvent, such as chloroform, or the like.

The reactions that produce aromatic nitriles, in accordance with this invention, may be illustrated by the following equations in which benzene, toluene, or anisole is used as the aromatic to be converted to a nitrile:

Equation I.—Reaction of benzene with cyanogen chloride

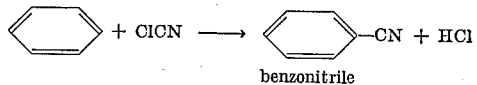

benzonitrile

Equation II.—Reaction of toluene with cyanogen chloride

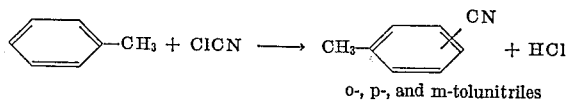

o-, p-, and m-tolunitriles

Equation III.—Reaction of anisole with cyanogen bromide

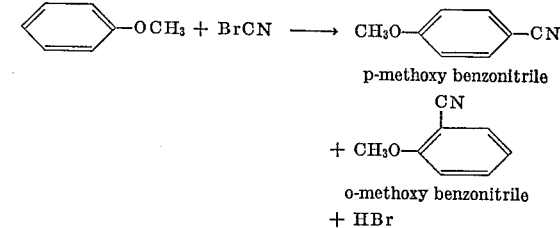

p-methoxy benzonitrile o-methoxy benzonitrile

+ HBr

As exemplified by the above equations, the reactions contemplated by this invention involve substitution of a cyano group for a hydrogen atom attached to the aromatic nucleus. Thus, substituent groups, if any, are not altered by these substitution reactions. Furthermore, it will be appreciated that the substituent groups tend to direct the cyano group to several different positions on the aromatic nucleus; consequently, the products of this invention often include a mixture of two or more isomers of an aromatic nitrile.

Various amounts of the reactants can be used for purposes of the present invention. As a rule, the amount of the cyanogen halide used will range from one percent of stoichiometric to 100 percent of stoichiometric. Usually, the aromatic compound will be used in large excess as solvent and diluent to prevent by-product reactions, e.g., polymerization of the cyanogen halides.

It will be appreciated that some of the aromatic compounds, i.e., naphthalene and the like, may be solids or liquid melts at the operating conditions of this process. Accordingly, as described, inert solvents such as chloroform and the like preferably are used as reaction media.

The process of this invention may be operated over a wide range of reaction temperatures, i.e., from about 0° C. to about 300° C. Thus, it has been found that reaction between benzene and cyanogen bromide to produce benzonitrile is preferably conducted over a range of from about 30° C. to about 250° C.

The pressures utilized by this process may extend from about atmospheric to superatmospheric pressures. Often the process is conducted at atmospheric pressure.

The amount of catalyst used to effect the reactions of this invention may vary considerably depending on whether the reaction is conducted as a batch-type operation, a continuous, or a semicontinuous process. Generally, during batch-type operation, it has been found that the amount of catalyst may extend from about 3 percent by weight to about 20 percent by weight of the charged aromatic compound. In continuous or semicontinuous processes, where one or more reactor vessels are employed with cyclic regeneration of the catalyst, the amount of catalyst, as measured in terms of the liquid hourly space velocity of the aromatic reactant may be in the range from about 0.25 to about 20. It will be understood that the catalysts of this invention may be readily regenerated during the cyclic continuous processes or subsequent to their use in batch-type operation by burning the contaminants off in an air stream at temperatures of about 500° C. from about one to about three hours.

The production of aromatic nitriles, in accordance with this invention, is conducted utilizing as a catalyst an alumino-silicate having an ordered internal structure which can be either naturally occurring or synthetically produced. These catalysts contain active sites that are formed by the presence of certain exchangeable metal cations and/or hydrogen ions ionically bonded or chemisorbed within the ordered internal structure of the alumino-silicate; preferably the cations are those which form a high concentration of hydrogen sites within the alumino-silicate.

It will be appreciated that the exchangeable cations and/or ions may be present within the catalyst by base exchanging them with either a naturally occurring or a synthetic alumino-silicate, by incorporating the cations and/or ions during the formation of a synthetic alumino-silicate, or by being an integral portion of a naturally occurring alumino-silicate. In general, the unique activity of the alumino-silicate catalyst for effecting the present reactions depends on the nature and concentration of its active sites as well as the availability of the sites for contact with the reactants.

In accordance with the present invention, several different types of alumino-silicates can be employed as catalysts. Particularly effective catalysts are the alumino-silicates that contain a high concentration of hydrogen sites within an ordered internal structure. These hydrogen sites are produced by ionically bonding or chemisorbing certain metal cations and/or hydrogen ions within the molecular structure of the alumino-silicate. Such bonding or chemisorption can be effected by base exchange of the alumino-silicate with a fluid medium containing the metal cations and/or hydrogen ions, the resulting exchanged product often thus acquiring an acid character.

Alumino-silicate catalysts having a high concentration of hydrogen sites can be prepared from a variety of naturally occurring and synthetic alumino-silicates. These alumino-silicates have exchangeable metal cations (e.g., alkali metals and alkaline earth metals) that can be completely or partially replaced, by conventional base exchange, with certain other metal cations and/or hydrogen ions to produce the necessary concentration of hydrogen sites within an ordered internal structure.

Some alumino-silicates can be base exchanged directly with hydrogen ions, as indicated in the preceding paragraph, to form products which have an acid character and which are suitable for use as catalysts. Other alumino-silicates such as zeolite X, a synthetic faujasite, are either not suitable for direct base exchange with hydrogen ions, or are not structually or thermally stable after a portion of their exchangeable metal cations have been replaced with hydrogen ions. Thus, it is often necessary to exchange other metal cations with these alumino-silicates in order to achieve the necessary stability within the ordered internal structure prior to the inclusion of the hydrogen ions.

Furthermore, the stability and the distribution of active cation sites formed within an alumino-silicate is also affected by the silicon to aluminum atomic ratio within its ordered internal structure. In an isomorphic series of crystalline alumino-silicates, the substitution of silicon for aluminum in the rigid framework of the lattice results in a decrease of total cation sites as evidenced by reduction of exchange capacity and proved by elemental analysis. Thus, among the faujasite isomorphs, the zeolite known as "Y" will have a sparser distribution of sites within its pores than the zeolite known as "X."

It has been found that alumino-silicates having a high silicon to aluminum atom ratio are particularly desirable as catalysts, for purposes of this invention. As a rule, the ratio of silicon to aluminum atoms is at least about 1.8 to 1, in this preferred type catalyst. These catalysts are readily contacted with solutions which contain hydrogen ions and are readily regenerated, after having been used, by contact at elevated temperatures with an oxygen containing stream under controlled conditions such that carbonaceous residues can be efficiently removed without damage to the essential structure and properties of the catalyst.

It will also be appreciated that the concentration of the hydrogen sites, within certain alumino-silicates, as described above, may vary according to the cations employed, the degree of base exchange, as well as the alumino-silicate being treated. Accordingly, it has been determined that the alumino-silicates having at least 0.5 milliequivalent of hydrogen per gram of solid and preferably above about 0.75 milliequivalent of hydrogen per gram of solid are effective catalysts for purposes of this invention. It will be understood that this value indicates the total concentration of hydrogen ions present within an alumino-silicate and that the spatial concentration of these ions is dependent on the ordered internal structure of the specific alumino-silicate being treated.

Because the unique activity of the alumino-silicate catalyst for effecting the reactions of the present invention is dependent on the availabiilty of active cation sites therein, as well as the nature of these sites, the defined pore size of the alumino-silicate is to be considered during its preparation. In general, the alumino-silicate should have a pore size of such dimensions that it can accept the reactants of this invention within its order internal structure and allow egress of the products. Thus, the pore size is from at least about 6 A. and preferably about 6 A. to about 15 A. in diameter. It will be appreciated that the selection of the alumino-silicate catalyst, to be used in a specific application, will depend upon the reactants and also the reaction products.

Typical of the alumino-silicates employed in accordance with this invention, are several alumino-silicates, both natural and synthetic, which have a defined pore size of from 6 A. to 15 A. within an ordered internal structure. These alumino-silicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the alumino-silicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the moles of $SiO_2$, and $y$ the moles of $H_2O$. The cation can be any one or more of a number of metal ions depending on whether the alumino-silicate is synthesized or occurs naturally. Typical cations include sodium, lithium, potassium, calcium, and the like. Although the proportions of inorganic oxides in the silicates and their spatial arrangement may vary, effecting distinct properties in the alumino-silicates, the two main characteristics of these materials are the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline alumino-silicates utilized by the present invention is the synthetic faujasite designated as zeolite X, and is represented in terms of mole ratios of oxides as follows:

$$1.0\pm0.2M_{2/n}O:Al_2O_3:2.6\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9Na_2O:Al_2O_3:2.5SiO_2:6.1H_2O$$

Zeolite X is commercially available in both the sodium and the calcium forms.

It will be appreciated that the crystalline structure of zeolite X is different from most zeolites in that it can adsorb molecules with molecular diameters up to about 10 A.; such molecules including branched chain hydrocarbons, cyclic hydrocarbons, and some alkylated cyclic hydrocarbons.

Other alumino-silicates are contemplated as also being effective catalytic materials for the invention. Of these other alumino-silicates, a synthetic faujasite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 5 and X may be a value up to about 9.

The selectivity of zeolite Y for larger molecules is appreciably the same as zeolite X because its pore size extends from 10 A. to 13 A.

Other alumino-silicate materials found to be active in the present process are designated as mordenite and mordenite-like structures. These zeolites have an ordered crystalline structure having a ratio of silicon atoms to aluminum atoms of about 5 to 1. In its natural state mordenite usually occurs as a salt of sodium, calcium and/or potassium. The pure sodium form may be represented by the following formula:

$$Na_8(AlO_2)_8(SiO_2)_{40}24H_2O$$

Mordenite has an ordered crystalline structure made up of chains of 5-membered rings of tetrahedra. In its sodium form the crystal is believed to have a system of parallel channels having free diameters of about 4.0 A. to about 4.5 A., interconnected by smaller channels, parallel to another axis, on the order of 2.8 A. free diameters. Advantageously, in certain ionic forms, e.g., acid exchanged, the mordenite crystal can have channels with effective free diameters of from about 6.5 A. to about 8.1 A. As a result of this crystalline framework, mordenite in proper ionic forms, sorbs benzene and other cyclic hydrocarbons.

It will be appreciated that other alumino-silicates can be employed as catalysts for the processes of this invention. A criterion for each catalyst is that its ordered internal structure must have defined pore sizes of sufficient diameters to allow entry of the preselected reactants and the formation of the desired reaction products. Furthermore, the alumino-silicate advantageously should have ordered internal structure capable of chemisorbing or ionically bonding additional metal and/or hydrogen ions within its pore structure so that its catalytic activity may be altered for a particular reaction. Among the naturally occurring crystalline alumino-silicates which can be employed are faujasite, heulandite, clinoptilolite, chabazite, gmelinite, mordenite and mordenite-like structures, and dachiardite.

One of the preferred alumino-silicate catalysts is prepared from the sodium form of zeolite X having a pore size of about 13 A. This alumino-silicate is a commercially available zeolite designated as Linde "13X" and is treated by conventional base exchanging involving partial or complete replacement of the sodium of zeolite X by contact with a fluid medium containing cations of one of the rare earth metals. Any medium which will effect ionization without affecting the crystalline structure of the zeolite can be employed. After such treatment, the resulting exchanged zeolite product is water washed, dried and dehydrated. The dehydration or calcination thereby produces the characteristic system of open pores, passages, or cavities of the crystalline alumino-silicates.

As a result of the above treatment, the rare earth exchanged alumino-silicate is an activated crystalline catalyst material in which the molecular structure has been changed by having rare earth cations chemisorbed or ionically bonded thereto. Because specific rare earth metal cations as well as a mixture of several different rare earth metal cations can be base exchanged with the alumino-silicate, the concentration of hydrogen cation sites produced within the catalyst can vary depending on the completeness of the exchange as well as the rare earth cations employed. Thus, it has been found that the rare earth exchanged zeolite X catalyst can contain from about 0.5 to about 1.0 milliequivalents of hydrogen per gram of solid catalyst. Furthermore, it will be appreciated that the defined pore size of the rare earth exchanged zeolite X, after it has been calcined as heretofore described, may vary from about 6 A. to 15 A., and preferably in the approximate range of 10 A. to 13 A. in diameter.

Advantageously, the rare earth cations can be provided from the salt of a single metal or preferable mixture of metals such as a rare earth chloride or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earth determined as oxides:

lanthanum, 45–46% by weight; cerium, 1–2% by weight; praseodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

Another active catalyst can be produced from zeolite X by base exchange of both rare earth cations and hydrogen ions to replace the sodium cations from the aluminosilicate. This base exchange can be accomplished by treatment with a fluid medium containing the rare earth salts followed by another containing hydrogen ions or cations capable of conversion to hydrogen ions. Inorganic and organic acids represent the source hydrogen ions, whereas ammonium compounds are representative of the compounds containing cations capable of conversion to hydrogen ions. It will be appreciated that this fluid medium can contain a hydrogen ion, an ammonium cation, or mixture thereof, and have a pH from about 1 to about 12.

Other effective catalysts can be prepared from aluminosilicates such as zeolite Y and mordenite. Advantageously, exchange of rare earth metals for the sodium cations within zeolite Y produces a highly active catalyst in a manner similar to that described for preparation of the rare earth exchanged zeolite X. In addition, because of its high acid stability, zeolite Y may be treated by partially replacing the sodium ions with hydrogen ions. This replacement can be accomplished by treatment with a fluid medium containing a hydrogen ion or an ion capable of conversion to a hydrogen ion (i.e., inorganic acids or ammonium compounds or mixture thereof).

Mordenite can be activated to serve as a catalyst for the instant invention by replacement of the sodium ion with a hydrogen ion. The necessary treatment is essentially the same as that described above for the preparation of acid zeolite Y except that a mineral acid such as HCl is used as a source of hydrogen ion. In general, the mordenite is reduced to a fine powder (approximately passing a 200 mesh sieve and preferably passing 300 and 325 mesh sieves or finer) and then acid treated.

It will be appreciated that cations of metals other than the rare earths having mono- and polyvalences can be employed to replace the exchangeable cations from the alumino-silicates to provide effective catalysts for this invention. Exemplary of these metals are zinc, magnesium, tin, cobalt, nickel, silver, and the like. Moreover, other higher valence metals such as zirconium, titanium, vanadium, chromium, manganese, iron, tungsten, and the like can also be employed. It is believed that the chemical properties of the metal, e.g., its atomic radius, degree of ionization, hydrolysis constant, and the like, may determine its suitability for exchange with a particular aluminosilicate material. It will also be appreciated that certain divalent metals such as calcium, barium, and magnesium can be used with ammonium chloride or like ammonium compounds to produce active cation sites within the alumino-silicate catalyst by conventional base exchange techniques, the ammonium ion being decomposed to form hydrogen sites by heating the exchanged alumino-silicate to drive off ammonia.

The alumino-silicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus it is contemplated that solid porous adsorbents, carriers and supports of the type heretofore employed in catalytic operations may feasibly be used in combination with the crystalline alumino-silicate. Such materials may be catalytically inert or may possess an intrinsic catalytic activity or an activity attributable to close association or reaction with the crystalline alumino-silicate. Such materials include by way of examples, dried inorganic oxide gels and gelatinous precipitates of alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline alumino-silicates may be prepared by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the alumino-silicate to a weight mean particle diameter of less than 40 microns and preferably less than 15 microns. Also, the alumino-silicate may be combined with and distributed throughout a gel matrix by dispersing the alumino-silicate in powdered form in an inorganic oxide hydrosol. In accordance with this procedure, the finely divided alumino-silicate may be dispersed in an already prepared hydrosol or, as is preferable, where the hydrosol is characterized by a short time of gelation, the finely divided alumino-silicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the alumino-silicate and then dried and calcined.

The inorganic oxide gel employed, as described above as a matrix for the metal alumino-silicate, may be a gel of any hydrous inorganic oxide, such as, for example, aluminous or siliceous gels. While alumina gel or silica gel may be utilized as a suitable matrix, it is preferred that the inorganic oxide gel employed be a cogel of silica and an oxide of at least one metal selected from the group consisting of metals of Groups II–A, II–B, and IV–A of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of about 55 to about 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline alumino-silicate and inorganic oxide gel matrix may vary widely with the crystalline alumino-silicate content ranging from about 2 to about 90 percent by weight and more usually, particularly where the composite is prepared in the form of beads, in the range of about 5 to about 50 percent by weight of the composite.

The catalyst of a alumino-silicate employed in the process of this invention may be used in the form of small fragments of a size best suited for operation under the specific conditions existing. Thus, the catalyst may be in the form of a finely divided powder or may be in the form of pellets of about $\frac{1}{16}''$ to about $\frac{1}{8}''$ in diameter, obtained upon pelleting the alumino-silicate with a suitable binder such as clay. The zeolite X, described hereinabove, may be obtained on a clay-free basis or in the form of pellets in which clay is present as a binder.

In addition, the unique activity of the alumino-silicate catalysts can be maintained at a high level, during cyclic continuous processes. This is accomplished by controlling the availability of the active sites within the ordered internal structure of the alumino-silicates. It will be realized, for example, that during reaction of cyanogen chloride with benzene and the like, some degradation and polymerization products may be formed which coat the alumino-silicate catalyst. This coating may block off the active sites of the catalyst from contact with the reactants, thus, gradually causing the catalyst to lose is effective activity. Advantageously, the adverse effects of such products can be overcome by regenerating the catalyst with a heated oxygen stream to burn off the products.

It will be appreciated that the operating conditions employed by the present invention will be dependent upon the specific reaction being effected. Such conditions as temperature, pressure, space velocity, and the like, will have important effects on the process. Accordingly, the manner in which these conditions affect the process of this invention may be more readily understood by reference to the following specific examples.

The reactions are carried out in a Vycor tubular reactor having a thermowell extending into the catalyst bed containing from about one to about 50 milliliters of calcined alumino-silicate catalyst. Free space ahead of the catalyst bed is filled with quartz chips as a preheat zone. The reactor is wrapped with resistance wire and insulated with asbestos tape and aluminum foil for providing the heat to it. A variable transformer is used to regulate the input. An ice cooled receiver and an air cooled receiver form a condensing system attached to the bottom of the reactor.

After the catalyst has been raised to reaction temperaure, the reactants are continuously passed over the catalyst for extended periods of operation.

Samples of the product stream are periodically condensed, removed, and analyzed by vapor phase chromatography, infrared techniques or by fractionation.

EXAMPLE I

Ten milliliters of a rare earth exchanged "13X" catalyst are placed in a Vycor tubular reactor and heated to a range of from 150° C. to 200° C. Then a solution containing 106 grams of cyanogen bromide and 500 grams of benzene is passed over the catalyst during a three hour period. At the end of the run, a liquid product condensate is collected and fractionally distilled to obtain 29 grams of benzonitrile. The conversion of canogen bromide to benzonitrile is 28 weight percent.

EXAMPLE II

Using an identical catalyst and following the same procedure as described in Example I, a run is made in a Vycor reactor at a temperature of 250° C. using 30 grams of cyanogen chloride and 200 grams of benzene for 1.5 hours. The resultant product contains 33 grams of benzonitrile.

EXAMPLE III

Twenty milliliters of 1/16 inch pellets of acid mordenite are placed in a tubular reactor and heated to a temperature of about 120° C. and 50 c.c. per hour of cyanogen chloride in a molar ratio of 20 moles of toluene per 3 moles of cyanogen chloride are passed over the acid mordenite for 5 hours. Recovery and analysis of the product shows that the weight percent conversion of cyanogen chloride to a mixture of tolunitrile isomers is 26 percent.

EXAMPLE IV

A solution of one mole of cyanogen bromide in 20 moles of mesitylene is passed at an hourly space velocity of 1 over a catalyst of acid zeolite "Y" which is at a temperature of 130° C. and which is in a Vycor reactor. After two hours, 555 grams of a liquid product are condensed and collected. Upon analysis, this product is found to contain fifteen grams of 2,4,6-trimethyl benzonitrile.

EXAMPLE V

Twenty milliliters of a rare earth exchanged "13X" catalyst are placed in a tubular reactor and heated to about 200° C. Then a solution of 1 mole of cyanogen chloride in 10 moles of anisole is at a liquid hourly space velocity of 20 and is passed over the catalyst. After two hours, a liquid product is obtained which contains 1.8 weight percent of a mixture of methoxybenzonitrile isomers.

EXAMPLE VI

Fifty grams of a rare earth-hydrogen exchanged "13X" zeolite catalyst are placed in a tubular reactor and heated to 200° C. Then 128 grams of naphthalene and 60 grams of cyanogen bromide dissolved in 500 milliliters of chloroform are passed over the rare earth-hydrogen exchanged "13X" zeolite during a five hour period. A liquid product containing 16.5 grams of mixed naphthonitriles is condensed and collected.

EXAMPLE VII

One thousand grams of anisole and 100 grams of an acid Y catalyst are stirred at 100° C. in a 2000 milliliter flask. Two hundred and ten grams of freshly distilled cyanogen bromide are added over a period of four hours with the temperature kept at 100° C. After an additional two hours at 100° C. the liquid is cooled and the catalyst is filtered off. Fractionation of the liquid yields 80 grams of methoxybenzonitriles.

It will also be appreciated that the examples set forth above as well as the foregoing specification are merely illustrative of the aromatic compounds that can be converted to nitriles in accordance with the present process and that other such reactants may be employed in the presence of the alumino-silicate catalysts contemplated by this invention.

It will further be appreciated that the alumino-silicates having active cation sites other than those used in the examples may be employed as catalysts for this process and that various modifications and alterations may be made in the process without departing from the spirit of the invention.

What is claimed is:

1. A process for producing aromatic nitriles which comprises reacting an aromatic compound containing from 6 to 20 carbon atoms and having the formula:

$$Ar(R)_n$$

wherein Ar is an aromatic nucleus having at least one hydrogen atom attached to it; R is a monovalent radical selected from the group consisting of alkyl, cycloalkyl, alkoxy, aryl, alkoxy alkyl, alkoxy cycloalkyl, aryloxy alkyl, aryloxy, and aralkyl, and $n$ is an integer from 0 to 4, depending on the identity of Ar, and a cyanogen halide selected from the group consisting of cyanogen chloride and cyanogen bromide in an amount from one percent to 100 percent of stoichiometric and at a temperature from about 0° C. to 300° C. in the presence of a catalyst comprising an aluminosilicate containing active cation sites formed from cations selected from the group consisting of the rare earth metals, ammonium, hydrogen, and mixtures thereof within an ordered internal structure having a uniform pore size of from at least about 6 A. to about 15 A. to produce a nitrile product corresponding to said aromatic compound wherein one of said hydrogen atoms is replaced by a cyano group and thereafter recovering said nitrile product.

2. The process of claim 1 in which the alumino-silicate catalyst is a rare earth exchanged faujasite.

3. The process of claim 1 in which the alumino-silicate catalyst is hydrogen exchanged zeolite Y.

4. The process of claim 1 in which the alumino-silicate catalyst is an acid mordenite.

5. The process of claim 1 in which the alumino-silicate is contained in and distributed throughout a thermally stable matrix binder.

6. The process of claim 1 in which the aromatic compound is benzene and the product is benzonitrile.

7. The process of claim 1 in which the aromatic compound is toluene and the product is a mixture of tolunitrile isomers.

8. The process of claim 1 in which the aromatic compound is mesitylene and the product is 2,4,6-trimethyl benzonitrile.

9. The process of claim 1 in which the aromatic compound is anisole and the product is a mixture of methoxybenzenitrile isomers.

10. The process of claim 1 in which the aromatic compound is naphthalene and the product is a mixture of naphthonitrile isomers.

References Cited

UNITED STATES PATENTS

| 2,606,917 | 8/1952 | Dixon | 260—465 |
|---|---|---|---|
| 3,002,990 | 10/1961 | Longfield et al. | 260—465 |
| 3,116,313 | 12/1963 | Fierce et al. | 260—465 |
| 3,231,600 | 1/1966 | Jones et al. | 260—465 |

OTHER REFERENCES

Miller, Chemical Week, Nov. 14, 1964, pp. 77–88.

CHARLES B. PARKER, *Primary Examiner.*

S. T. LAWRENCE III, *Assistant Examiner.*

U.S. Cl. X.R.

252—450, 454

PO-1050
(5/69)

UNITED STATES PATENT OFFICE
CERTIFICATE OF CORRECTION

Patent No. 3,433,821  Dated March 18, 1969

Inventor(s) Lyle A. Hamilton and Phillip S. Landis

It is certified that error appears in the above-identified patent and that said Letters Patent are hereby corrected as shown below:

Column 5, line 28, "2.6" should be --2.5--. Column 9, line 48, "canogen" should be --cyanogen--.

SIGNED AND
SEALED

AUG 26 1969

(SEAL)

Fletcher, Jr.
Attesting Officer

WILLIAM E. ......, JR.
Commissioner of Patents